United States Patent [19]

Schweiger et al.

[11] 3,714,210

[45] Jan. 30, 1973

[54] PROCESS FOR EXTRACTING FULL FAT SOYBEAN FLAKES OR MEAL

[75] Inventors: Richard G. Schweiger, Muscatine, Iowa; Siegfried A. Muller, Ridgefield, Conn.

[73] Assignee: Grain Processing Corporation, Mascatin, Iowa

[22] Filed: June 5, 1970

[21] Appl. No.: 43,982

[52] U.S. Cl. .............................................. 260/412.8
[51] Int. Cl. ............................................... C11b 1/10
[58] Field of Search ................................... 260/412.8

[56] References Cited

UNITED STATES PATENTS 2,662,907  12/1953  Henn et al. ....................... 260/412.8
2,680,754  6/1954  Stapelberg et al. ................. 260/412.8

*Primary Examiner*—Lewis Gotts
*Assistant Examiner*—Johnnie R. Brown
*Attorney*—Pendleton, Neuman, Williams & Anderson

[57] ABSTRACT

Soybean flakes or meal are extracted with two-phase liquid solvent system; one phase consisting essentially of one or more lipophilic solvents and the other phase consisting essentially of a mixture of water and one or more water-miscible solvents. Oil and non-proteinaceous materials are simultaneously extracted providing a soy protein concentrate product which is light in color and bland in taste.

5 Claims, No Drawings

PROCESS FOR EXTRACTING FULL FAT SOYBEAN FLAKES OR MEAL

Presently, crude soybean oil is obtained by extraction of full fat soybean flakes with hexane. The crude oil then is refined to a food grade product. After removal of the hexane from the residue by evaporation, the so-called defatted flakes or, after grinding, defatted meal are obtained.

Defatted flakes usually have a protein content of about 52–57% but are objectionable for human consumption mainly because of unpleasant flavor. Accordingly, for this and other reasons, they usually are toasted to produce a meal with an improved flavor, or they are further extracted with aqueous alcohol. The further separate extraction with aqueous alcohol removes low molecular weight compounds, such as carbohydrates, part of the flavor components, etc., and, consequently, results in a soy protein concentrate with an increased protein content and somewhat improved flavor. However, although the flavor may be improved, the removal of off-flavors is not sufficiently complete to provide a very bland and universally acceptable product.

A principal object of the present invention is to provide a one-step extraction process for full fat soybean flakes or meal whereby soybean oil and, simultaneously, soy protein concentrate of a high quality are obtained.

Another object of the present invention is to provide a one-step extraction process in which non-proteinaceous substances and impurities, such as flavor components, pigments, etc. are removed more easily and more readily than by conventional sequential multiple extraction processes.

Still another object of this invention is the production of soy protein concentrate with desirable qualities, such as bland taste and light color.

Other objects of this invention will become apparent as the description thereof proceeds.

In general, the process of this invention involves extracting full fat soybean flakes or meal with a two-phase liquid solvent system; the one phase of the solvent system essentially consisting of one or more lipophilic solvents, such as hexane, cyclohexane and the like, and the other phase of the solvent system consisting essentially of a mixture of water and one or more water-miscible solvents, such as methanol, ethanol, isopropanol, acetone and the like. In the aqueous phase of the solvent system the ratio of water to water-miscible solvent ranges from about 2:8 to 4:6, preferably about 3:7, on a volume to volume basis. The volume ratio of the non-aqueous to the aqueous phase ranges from about 1:2 to 2:1 and most preferably is 1:1.

Typically, the process of this invention is carried out by mixing full fat soybean flakes or meal (ground flakes) at room temperature or above for about 0.5 to 2 hours with about 5–20 parts by weight of a mixture of three types of solvents, i.e., a lipophilic solvent, such as hexane, a water-miscible solvent, such as methanol, and water, at a ratio of, for example, 10:7:3 (v./v.). This solvent mixture separates into two liquid phases, and, after extraction, the lipophilic solvent phase contains essentially the soy oil while the other phase contains low molecular weight compounds present in the soybean flakes, such as carbohydrates, flavor components, pigments, etc. The temperature during extraction is not critical and can be below or above room temperature but, for practical purposes, should be below the boiling point of the solvents employed. After extraction and solvent removal, the protein-containing product is dried, preferably in vacuo, to avoid excessively high temperatures which may denature the protein. Temperatures below about 50° C. can be satisfactorily employed for drying the extracted material.

The extraction can be repeated a number of times depending upon the content of protein desired in the product. The extraction can be conducted in accordance with known solvent extraction procedures but countercurrent extraction procedures are preferred.

By extraction of full fat soybean flakes in accordance with this invention both oil and other non-protein materials are removed simultaneously. This provides definite advantages over conventional sequential extraction processes in which oil and non-protein materials are extracted separately. We have found that by the simultaneous extraction with a two-phase solvent system, non-proteinaceous materials are removed more easily and more completely than by conventional sequential extractions. Consequently, less effort and smaller amounts of solvents are required to obtain a product having a desired protein content and also flavor components and pigments are removed more completely. The products obtainable by this process, therefore, are more bland in taste and lighter in color than corresponding products obtainable by prior art processes.

The following examples further illustrate the present invention.

EXAMPLE I

This example is illustrative of conventional sequential multiple extraction processes. Full fat soybean flakes (20 g.) were mixed in a reciprocal shaker with 200 milliliters of hexane saturated with 70 percent aqueous methanol for 1 hour at 26° C. The mixture was then filtered and the solids washed on the filter with 40 milliliters of the same solvent. The previously extracted solids were then further extracted in the same manner with 200 milliliters of 70 percent aqueous methanol (v./v.). After filtration the solids were washed with 40 milliliters of 70 percent aqueous methanol and the resulting soy protein concentrate dried in vacuo at 40° C. The average protein content of products from six runs carried out in this manner was 64.5 percent (dry basis) with an average protein recovery of 91 percent.

EXAMPLE II

Full fat soybean flakes (20 g.) were suspended in a two-phase liquid solvent mixture consisting of 100 milliliters of hexane and 100 milliliters of 70 percent aqueous methanol (v./v.). After mixing at 26° C. on a reciprocal shaker for 1 hour, the mixture was filtered and the solids washed on the filter with 40 milliliters of the same solvent mixture. The extraction and washing was once repeated and the material thus obtained dried in vacuo at 40° C. The average protein content of the resulting soy protein concentrate from seven runs carried out in this manner was 67 percent (dry basis) with a protein recovery of 92 percent and a fat content of below 1 percent. The products were lighter in color and considerably blander in taste than those obtained in Example I.

EXAMPLE III

When extracting full fat soybean flakes as described in Example II but at a temperature of 37° C. the product obtained had a protein content of 69.5 percent.

EXAMPLE IV

Full fat soybean flakes (150 g.) were stirred one hour at room temperature with 3 liters of a two-phase liquid solvent mixture consisting of hexane, methanol, and water in a ratio of 10:7:3 (v./v.), which had been used twice previously for extracting soybean flakes. The solids then were filtered off on a medium fritted glass funnel and extracted similarly with a similar solvent mixture which had been previously used once for extracting soybean flakes and finally were extracted again with a fresh solvent mixture of the same composition. The product thus obtained was dried in vacuo below 45° C. The protein content of the product was 72.7 percent, fat content 0.9 percent, and the weight recovery 80 percent, all on dry basis. Tastewise, the product compared favorably with high quality commercial soy protein products.

Those modifications and equivalents which fall within the spirit of the invention are to be considered a part thereof.

What is claimed is:

1. A process for simultaneously extracting oil and low molecular weight non-proteinaceous components of soybeans which comprises contacting full fat soybean flakes or full fat soybean meal with a liquid solvent system susceptible to separation into two phases, said solvent system containing a lipophilic solvent for soybean oil, water and a water-miscible solvent for low molecular weight hydrophilic-solvent soluble components of soybeans, separating the solvent system from the so-contacted soybean materials and drying the solid soybean residue material.

2. A process in accordance with claim 1, wherein contacting of said soybean materials with said liquid solvent system is conducted in countercurrent manner.

3. A process in accordance with claim 1, wherein the lipophilic solvent is an organic oil solvent, and the water-miscible solvent is an alcohol or acetone.

4. A process in accordance with claim 1, wherein the ratio of water to water-miscible solvent ranges from about 2:8 to 4:6 on a volume basis and wherein the ratio of lipophilic solvent to the water and water-miscible solvent ranges from about 1:2 to 2:1 on a volume basis.

5. A process in accordance with claim 1, wherein the lipophilic solvent is hexane and the water-miscible solvent is methanol.

* * * * *